United States Patent
Boyd et al.

(10) Patent No.: US 6,741,414 B1
(45) Date of Patent: May 25, 2004

(54) JOINT SPINDLE SPEED AND HEAD POSITION CONTROL IN ROTATING MEDIA STORAGE SYSTEMS

(75) Inventors: Stephen Boyd, Stanford, CA (US);
Sunil C. Shah, Los Altos, CA (US);
Mark Erickson, San Bruno, CA (US);
Ioannis Kanellakopoulos, Cupertino, CA (US)

(73) Assignee: Tokyo Electron Limited, Tokyo (JP)

( * ) Notice: Subject to any disclaimer, the term of this patent is extended or adjusted under 35 U.S.C. 154(b) by 599 days.

(21) Appl. No.: 09/595,455

(22) Filed: Jun. 15, 2000

Related U.S. Application Data
(60) Provisional application No. 60/139,351, filed on Jun. 15, 1999.

(51) Int. Cl.[7] .............................. G11B 15/46
(52) U.S. Cl. .................................... 360/73.03
(58) Field of Search ........................ 360/73.03, 73.08, 360/73.04, 73.06, 60, 97.04, 73.02, 75; 369/30.13, 53.3; 318/138, 569

(56) References Cited

U.S. PATENT DOCUMENTS

| | | | | |
|---|---|---|---|---|
| 4,306,259 A | * | 12/1981 | Saito et al. .............. 360/97.04 |
| 5,095,254 A | * | 3/1992 | Ueki .......................... 318/138 |
| 5,381,279 A | | 1/1995 | Dunn | |
| 5,384,524 A | * | 1/1995 | Romano ..................... 318/569 |
| 5,701,284 A | | 12/1997 | Lee | |
| 5,726,958 A | * | 3/1998 | Min ......................... 369/30.13 |
| 6,038,096 A | | 3/2000 | Zhang et al. | |
| 6,067,202 A | * | 5/2000 | Rowan et al. ........... 360/73.03 |
| 6,067,203 A | * | 5/2000 | Ottesen et al. .......... 360/73.03 |
| 6,078,458 A | * | 6/2000 | Fioravanti et al. ....... 360/73.03 |
| 6,088,314 A | * | 7/2000 | Tachibana et al. ........ 369/53.3 |
| 6,104,566 A | * | 8/2000 | Stephenson .............. 360/73.03 |
| 6,118,743 A | * | 9/2000 | Kumita .................... 369/47.44 |
| 6,219,909 B1 | * | 4/2001 | Ogawa et al. ................ 29/840 |
| 6,236,527 B1 | * | 5/2001 | Uchiike et al. ............... 360/75 |
| 6,304,405 B1 | * | 10/2001 | Asano et al. ............ 360/73.03 |
| 6,351,441 B1 | * | 2/2002 | Andoh ....................... 369/53.3 |
| 6,388,832 B1 | * | 5/2002 | Dobbek et al. .......... 360/73.03 |
| 6,487,033 B1 | * | 11/2002 | Heydt et al. .................. 360/60 |

* cited by examiner

*Primary Examiner*—David Hudspeth
*Assistant Examiner*—Fred F. Tzeng
(74) *Attorney, Agent, or Firm*—Blakely, Sokoloff, Taylor & Zafman LLP.

(57) ABSTRACT

A method and system for joint spindle speed and head position control in rotating media storage systems are described. A controller changes the rotation speed of a spindle assembly based upon the position information of a desired data sector. This controller may also control the actuator assembly based upon the position information of the desired data sector.

26 Claims, 11 Drawing Sheets

(slow-down)

(speed-up)

JOINT SPINDLE SPEED AND HEAD POSITION CONTROL IN ROTATING MEDIA STORAGE SYSTEMS

REFERENCE TO RELATED APPLICATIONS

This application claims the benefit of U.S. Provisional Application No. 60/139,351, filed on Jun. 15, 1999, titled "Joint Spindle Motor and Head Position Control in Rotating Media Storage."

BACKGROUND OF THE INVENTION

1. Field of the Invention

The present invention relates to rotating media storage systems. More particularly, the present invention relates to a method and system for joint spindle speed and head position control to reduce rotational latency and seek/settle time of the rotating media storage system, and thus increase the overall performance of the system.

2. Description of Related Art

Fast and accurate access of stored data while minimizing power consumption, noise, heat generation, and mechanical disturbances are some of the most important considerations when designing and optimizing rotating media storage systems. In addition, there is an ever-present desire to decrease the average time required to access any needed data on the rotating medium (for example, a disk) while maintaining reasonable costs for performing the access.

For current rotating media storage devices such as computer hard disks, compact disks (CDs and CD-ROMs), digital video disks (DVDs), magneto-optical disks, etc., the location of the stored data is generally tracked by two indicators: "track" and "sector". The first indicator, "track", refers to what track the data is located on, and the second indicator, "sector", refers to the radial position on the track where the data is located (i.e., the sector/radial position is between 0 and 360 degrees).

In general, there are two types of data storage/data access on rotating media. The first is structured/ordered data storage/access and the second is random data storage/access. In structured/ordered data storage/access (for example, streaming video) all rotating media tracks are block-recorded next to each other, and the blocks are accessed in the order in which they are saved, thus making the stored data more compressed and more predictable to find and access. In random data storage/access (for example, transaction data for credit cards) the stored data may consist of numerous individual records located throughout the entire rotating media and accessing those individual records may be done in a random manner and not by adjacent blocks. Locating and randomly accessing such random stored data is more difficult and time-consuming.

Referring to FIG. 1, a simplified block diagram of an example rotating media storage device 10 (for example, a computer hard drive system) is illustrated. Rotating media storage device 10 includes a disk platter (for use with a disk) 20 and a disk drive read-write head assembly 25. The disk 20 rotates about a spindle 30, driven by a spindle motor 35, as controlled by a spindle motor control system 40.

Most existing rotating media storage systems, such as the computer hard disk drive shown in FIG. 1, have disk platters 20 that rotate (i.e., spin) at a fixed rotational speed (e.g., 5,000 rpm, 7,600 rpm, or 15,000 rpm). The spindle motor control system 40 is a low bandwidth (typically under 10 Hz) control system for maintaining the steady-state rotational speed of the spindle 30. The speed of revolution of the disk platter is therefore controlled by the spindle motor 35 and spindle motor control system 40.

The read-write head assembly 25 is attached to an actuator assembly 50 (actuator). In the hard disk drive example, the actuator 50 is usually a radial or voice coil motor (VCM) or in other applications may be a linear (push/pull) motor, etc. The actuator control system 55 is a high bandwidth (e.g., 400 Hz to 900 Hz) control system that seeks a new track 21 rapidly and maintains the head position over the rotating storage media track 21.

Disk drive interface controller 60 controls the overall operation of the disk drive system and the exchange of data between the disk drive and the host device such as a CPU. Read-write control 65 controls the read and write operations on the disk by the head assembly 25. Power supply 70 provides the necessary power to drive the disk drive system 10. In FIG. 1, power supply 70 is illustrated as being connected to spindle motor control 40 and actuator control 55, however, it should be noted that there could be multiple power supplies that are individually coupled to each of the controls and/or the power supply may be part of (or supplied by) the CPU. Other embodiments and variations on the connections of the power supply may also be used.

Limits do exist on how fast the read-write head assembly 25 can physically move from the outermost edge 20a of the disk platter 20 all the way to the innermost edge 20b of the platter 20. Furthermore, faster track seeks (i.e., faster movement of the head assembly 25) can lead to increases in noise generation, mechanical disturbance, power consumption, heat generation, and other conditions that may negatively impact the performance of the rotating media storage system.

Currently, some systems use trajectory optimization to improve the tracking of the head assembly 25 to the desired track. Such trajectory optimizations may be performed by minimizing the arrival time, $t_f$, of the head to the desired track over the design trajectory of the actuator, $u_{Actuator}(t)$. The trajectory optimization may be formulated as:

$$x_0 \rightarrow \begin{array}{l} \min(t_f) \\ u_{Actuator} \\ \text{subject to:} \\ l_1 < u_{Actuator} < l_2 \\ x_{PES}(t_f) = 0 \\ \dot{x}_{PES}(t_f) = 0 \\ x_{PES}(t_0) = x_0 \\ \dot{x}_{PES}(t_0) = 0 \\ J_2\ddot{x} = u_{Actuator} \end{array} \rightarrow u_{Actuator}(t)$$

where $x_0$ is the initial radial position of the head position actuator, $x(t)$ is the radial head position at time t, $u_{Actuator}$ are the design variables of the actuator, $l_1 < u_{Actuator} < l_2$ are the constraints on the actuator authority where $l_1$ and $l_2$ are the lower and upper limits, respectively, based on the actuator constraints and hardware, $x_{PES}(t)$ is the radial head position error and $x_{PES}(t) = x_{Desired} - x(t)$, $x_{PES}(t_f) = 0$ is the arrival position error, $\dot{x}_{PES}(t_f) = 0$ is the arrival velocity error, $x_{PES}(t_0) = x_0$ is the starting position error, $\dot{x}_{PES}(t_0) = 0$ is the starting velocity error, and $J_{2\ddot{x}=u_{Actuator}}$ is the physical equation of motion for radial head position where $J_2$ is a coefficient of inertia and $\ddot{x}$ is acceleration.

It should be noted that the physical equations of motion given in the formulation above have been simplified for ease of understanding herein. As such, one with ordinary skill in the art would know that the equations of motion given in the formulation above are merely representational and other equations of motion with greater detail and more variables may be used.

This formulation addresses optimal head position (track seek).for constant spindle speed. In actuality the above trajectory optimization does not take into account the spindle speed at all because the spindle speed in this design is not a variable.

The solution to this trajectory optimization problem is the so-called switching function solution (Bryson and Ho, Applied Optimal Control, 1967). An approximation to this switching function is used in some systems and is described by PTOS (Proximate Time Optimal Solution) (See Franklin, Powell, and Workman, Digital Control, 1992, pp 583–584, Chapters 11 and 12). The switching function solution, also known as "bang-bang control", pushes as fast as it can for half the time and then reverses and pushes in the opposite direction for the remaining half of the time in order to reach a desired location. In other words, in the hard disk drive example, the switching function solution would first determine how long it would take to move the head from the starting position to the desired position (i.e., time period for arrival). Once the time period for arrival is determined, then the switching function solution pushes the actuator with the greatest force possible (given the constraints and conditions of the system) for half the length of the time period for arrival and then instantaneously reverses the direction of the push on the actuator (while keeping the same amount of force) for the remaining half of the time period for arrival. Using the switching function solution, the head arrives at the desired track with very little positioning error. However, the time period for arrival is not decreased and thus the latency of the system does not improve.

However, the most significant drawback with current rotating media storage designs is that the head position control system 55 is decoupled from (i.e., not joint with) the spindle motor control system 40. Therefore, in existing rotating media storage systems, there is no relationship between the spindle motor control 40 and the actuator motor control system 55.

The most widespread method used to access the data stored on rotating media involves simply moving the head to the right track as fast as the system is capable. Once the head reaches the desired track, the head signals that it has reached the desired track and then waits for the platter to spin and bring the desired data sector under the head for reading/writing. This method does not take into account the spindle/radial position (i.e., the specific sector on the rotating media or the angle at which the data is located radially) because the head position control system is decoupled from the spindle motor control. This configuration is inefficient and results in slow data access times of the stored data.

As an example, consider a current rotating media storage device, such as a disk drive system, where data to be accessed is located at a radial position/sector $(x_{PES}(t_f), \theta_{spindle}(t_f),$ where $\theta\in[0,2\pi))$ that is close to or exactly parallel to the radial position of the read-write head, but is located on a different track. During the time it takes to position the head at the desired track, the platter will already have rotated a fraction of a revolution. Employing the fastest head position control system currently available will not enable the head to reach the data position in time. Therefore, the rotating media storage system will have to wait for the platter to rotate a full revolution until the desired data arrives back at the specific location where the head can finally access it.

Another existing rotating media storage design employs a method called "Just in Time Seek" to access stored data. The "Just in Time Seek" method takes into consideration the track and sector of the desired data. The "Just in Time Seek" method first calculates how much time it will take for the head to get to the desired track location. The method then predicts whether the head-will be able to reach the desired track location at the same time that the desired sector location would be in a read/write position under the head, given the specific spindle speed (which is always kept constant). If the prediction results indicate that the desired sector location will be missed, the rotating media storage system directs the head to take a slower than nominal track seek time. It should be noted that the "Just in Time Seek" method slows down the head to its lowest possible speed. The spindle speed never changes. Thus, the major drawback of the "Just in Time Seek" method is that the system is not getting the data any faster and consequently there is no improvement in data access time. The benefits of the "Just in Time Seek" method are the reduction in power consumption, noise, and heat generation due to the slower motion of the actuator head.

Yet another existing rotating media storage design employs a method that modifies the spindle speed based on the specific electrical power source used to power the rotating media storage device. This method selects a particular spindle speed that is best suited to the type of external power source (for example, micro battery, AC source, etc.) running the device. The only purpose for changing the spindle speed is to minimize the power consumption of the device. Once the spindle speed selection is finalized upon detection of the power source, the spindle speed remains constant throughout the device operation mode (or until the device is shutdown, in a standby mode, or until a different type of power source is to be used). One major disadvantage with this method is that it does not allow the spindle speed to vary based on the location of the requested data. The spindle speed selection is strictly based on the type of external power source used.

What is needed is a method and/or system that couples seek trajectory commands that direct the movement of the head from track to track with spindle speed change commands to either slow down or speed up the platter in order to more rapidly access the desired data (track, sector).

SUMMARY OF THE INVENTION

A method and system for joint spindle speed and head position control in rotating media storage systems are described. A controller changes the rotation speed of a spindle assembly based upon the position information of a desired data sector.

Other features and advantages of the present invention will be apparent from the accompanying drawings, and from the detailed description, which follow below.

DETAILED DESCRIPTION OF THE INVENTION

Figure 1:
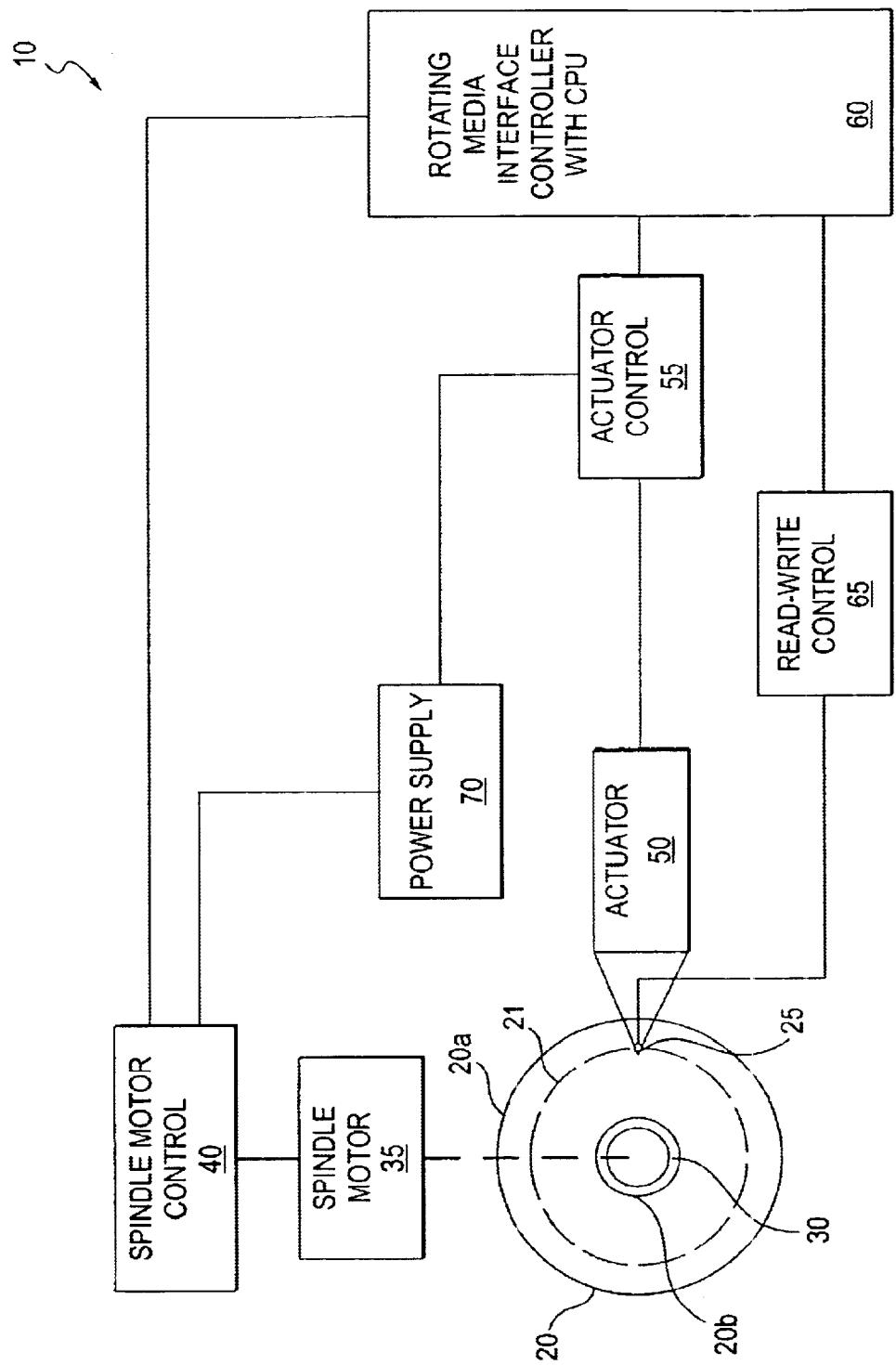
FIG. 1 shows a block diagram of one example of a prior art rotating media storage device.

A method and system for joint spindle speed and head position control in rotating media storage systems is described. The present invention is capable of reducing the rotational latency and seek/settle time of the rotating media storage system, thus the present invention may increase the overall performance of the system.

The present invention may be integrated into a single software package that allows a rotating media storage system designer to quickly and easily generate a design for joint spindle speed and head position control in a single system. A decision-making or advising module may also be integrated into the software package, thus augmenting the present invention. When implemented in this manner, the present invention may be carried out in an automated way, using little or no information from the user.

The present invention may also be integrated into a procedure that could be manually executed by a rotating media storage system designer. When implemented in this fashion, the present invention may employ the user's knowledge to obtain better performance and/or shorter design time for system employing joint spindle speed and head position control.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention. It is to be understood that other embodiments may be utilized and that logical, mechanical, electrical and other changes may be made without departing from the scope of the present invention.

Some portions of the detailed description that follows are presented in terms of algorithms and symbolic representations of operations on data bits within a computer system. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities may take the form of electrical or magnetic signals or other qualities of a system that are capable of being stored, transferred, combined, compared, measured, and otherwise manipulated. It has proven convenient at times, principally for reasons of common usage, to refer to these signals as bits, values, elements, symbols, characters, terms, numbers, variables, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of rotating media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

In the present invention, joint spindle speed and head position control permits a reduction in access time, rotational latency, and seek/settle time. There are several embodiments of the present invention and as such there may be several combinations of embodiments that may make up a particular system. One embodiment is joint spindle speed and head position control for rotating media storage systems having a constant and specific/prespecified (nominal) speed during which read and write may occur. Another embodiment is joint spindle speed and head position control for rotating media storage systems having varying/multiple speeds duing which read and write may occur. Still another embodiment of the present invention enables the design optimization of rotating media storage systems having joint spindle speed and head position control. Each embodiment will be further described in detail below.

Joint Spindle Speed and Head Position Control for Nominal Speed Read and Write Rotating Media Storage Systems In most of the current read-write channels and servo systems, the designs require that the read and write operations occur at constant fixed rates (i.e., constant rotational speed) and at a specific/prespecified single speed (hereinafter referred to as "nominal speed"). Assuming that this restriction of read and write to occur at nominal speed remains, the present invention includes a joint control system that enables both the head position and spindle speed to attain the desired values before read-write operation. The present invention uses trajectory optimization in the joint control system to minimize the arrival time, $t_f$, of the head to the desired track and sector over the design trajectories of the actuator and spindle, $u_{Actuator}$ and $u_{spindle}$ respectively. For example, the trajectory optimization in a joint control system may be formulated as:

$$\theta_0, x_0 \rightarrow \begin{array}{c} \min(t_f) \\ u \\ \text{where } u = \begin{bmatrix} u_{Actuator} \\ u_{Spindle} \end{bmatrix} \\ \text{subject to:} \\ l_1 < u_{Actuator} < l_2 \\ l_3 < u_{Spindle} < l_4 \\ \theta_{Spindle}(t_f) = 2n\pi, n \in \{-1, 0, 1\} \\ \dot{\theta}_{Spindle}(t_f) = \omega_0 \\ x_{PES}(t_f) = 0 \\ \dot{x}_{PES}(t_f) = 0 \\ \theta_{Spindle}(t_0) = \theta_0 \\ \dot{\theta}_{Spindle}(t_0) = \omega_0 \\ x_{PES}(t_0) = x_0 \\ \dot{x}_{PES}(t_0) = 0 \\ J_1 \ddot{\theta} = u_{Spindle} \\ J_2 \ddot{\theta} = u_{Actuator} \end{array} \rightarrow \begin{array}{c} u_{Actuator}(t) \\ u_{Spindle}(t) \end{array}$$

where $x_0$ is the initial radial position of the head position actuator, $\theta_0$ is the initial angular position of the spindle, $x(t)$ is the radial head position at time t, $\theta_{Spindle}(t)$ is the angular position of the spindle at time t, $u_{Actuator}$ are the design variables of the actuator, $u_{Spindle}$ are the design variables of the spindle, $l_1 < u_{Actuator} < l_2$ are the constraints on the actuator authority where $l_1$ and $l_2$ are the lower and upper limits, respectively, based on the actuator constraints and hardware, $l_3 < u_{Spindle} < l_4$ are the constraints on the spindle where $l_3$ and $l_4$ are the lower and upper limits, respectively, based on the spindle constraints and hardware, $\theta_{Spindle}(t_f) = 2\pi$ is the arrival angular spindle position where $n \in \{-1, 0, 1\}$, $\dot{\theta}_{Spindle}(t_f) = \omega_0$ is the arrival angular spindle velocity, $x_{PES}(t)$ is the radial head position error and $x_{PES}(t) = x_{Desired} - x(t)$, $x_{PES}(t_f) = 0$ is the arrival position error, $\dot{x}_{PES}(t_f) = 0$ is the arrival velocity error, $\theta_{Spindle}(t_0) = \theta_0$ is the starting angular spindle position, $\dot{\theta}_{Spindle}(t_0) = \theta_0$ is the starting angular spindle velocity, $x_{PES}(t_0) = x_0$ is the starting position error, $\dot{x}_{PES}(t_0) = 0$ is the starting velocity error, $J_1 \ddot{\theta} = u_{Spindle}$ represents the platter rotation physical equations of motion for angular spindle position where $J_1$ is a coefficient of inertia and $\ddot{\theta}$ is acceleration of the spindle, and $J_2 \ddot{x} = u_{Spindle}$ represents the physical equations of motion for radial head position where $J_2$ is a coefficient of inertia and $\ddot{x}$ is acceleration of the head.

It should be noted that the physical equations of motion given in the formulation above have been simplified for ease of understanding herein. As such, one with ordinary skill in the art would know that the equations of motion given in the formulation above are merely representational and other equations of motion with greater detail and more variables may be used. It should also be noted that the equations for $\theta_{Spindle}(t_f) = 2n\pi$ and $\theta_{Spindle}(t_0) = \theta_0$ may also be formulated with constants.

Another option on the above trajectory optimization formulation is to set bounds on the velocity of the spindle such that the spindle velocity cannot exceed a certain maximum limit and cannot decrease below a certain minimum limit, such that $\omega_{min} < \dot{\theta} < \omega_{max}$. It should be noted that the trajectory optimization formulation given above does not take into account such bounds on the velocity of the spindle.

It should also be noted that in the trajectory optimization formulation given above the head position, x(t), and spindle position, θ(t), are physically uncoupled such that when one is changed the other does not necessarily have to be changed. In other embodiments, however, it may be desirable to have the head position and spindle position physically coupled together such that when one is changed the other may be changed simultaneously.

Additionally, it should be noted that the trajectory optimization may also be formulated such that the arrival time, $t_f$, of the head to the desired track and sector is minimized not only over the design trajectories of the actuator and spindle, $u_{actuator}$ and $u_{Spindle}$, respectively, but also is minimized over n. In other words, minimizing the number of rotations or the amount of the rotation of the spindle to reach the arrival angular spindle position, $\theta_{Spindle}(t_f)=2n\pi$.

Trajectory optimization in the joint control system can be performed using numerical optimization techniques (Linear/Nonlinear Programming, Convex Optimization) and discretizing the dynamics of the spindle and servo in time for each n and then picking the minimum over n. Alternatively, a switching function can be developed that optimizes the trajectory (Bryson and Ho, Applied Optimal Control, 1967). Numerical optimization can be formulated over parameters of the switching function.

Figure 2:
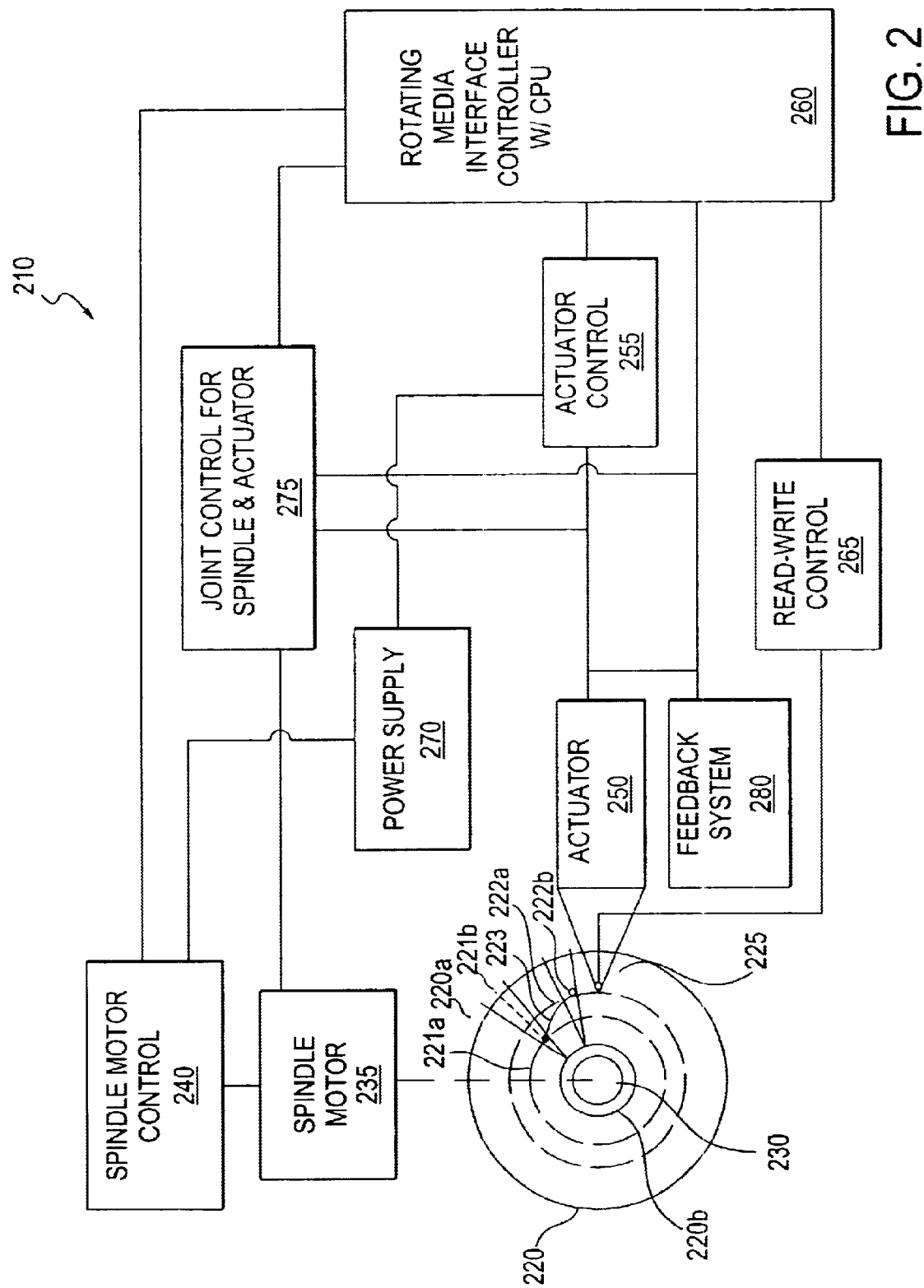
FIG. 2 shows a block diagram of one embodiment of a rotating media storage device employing a system for joint spindle speed and head position control in accordance with the principles of the present invention.
Figure 11:
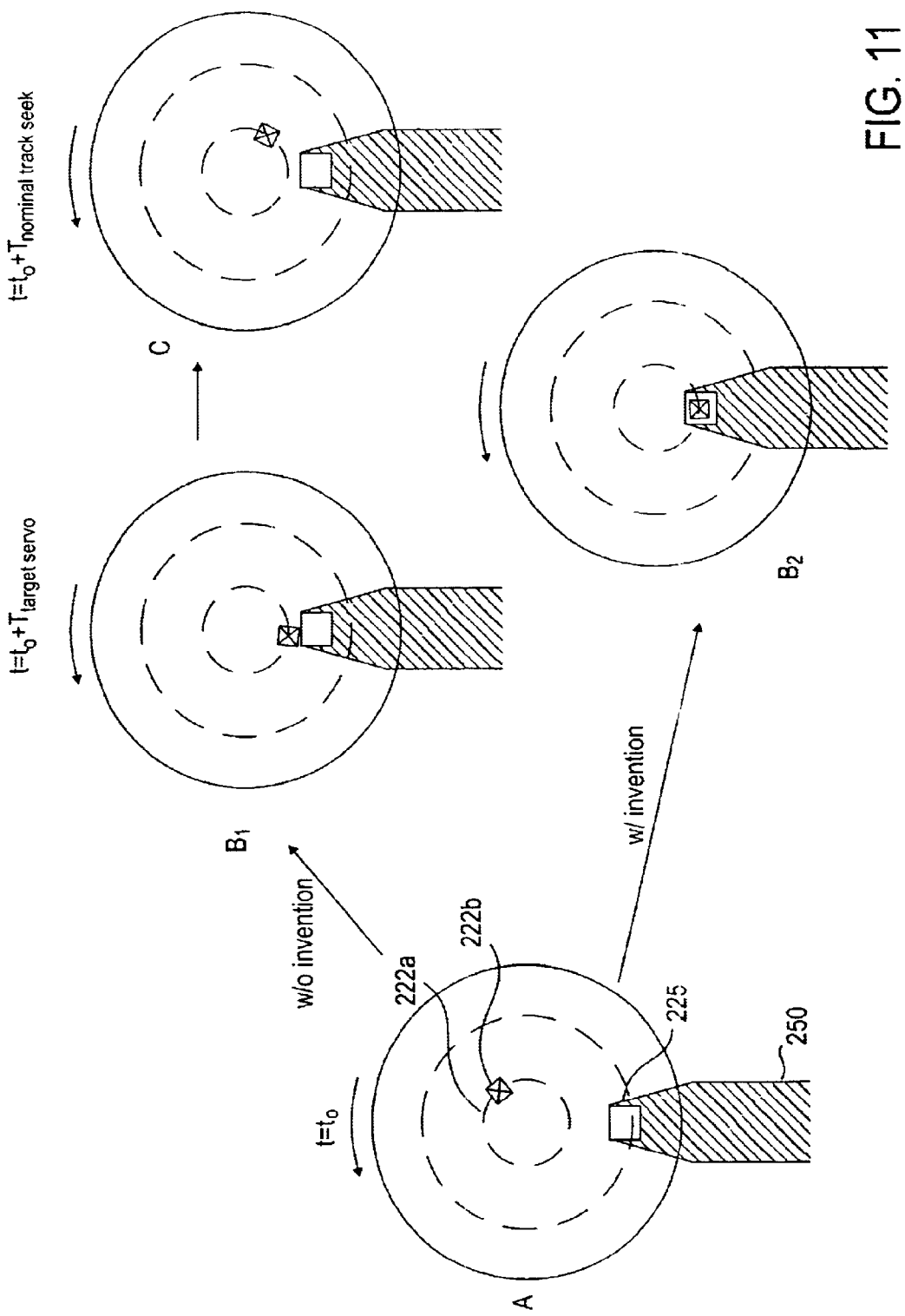
FIG. 11 shows an enlarged version of the disk, head, and actuator of FIG. 2 and illustrates an embodiment of the present invention where the spindle speed is slowed own versus prior art processes having nominal spindle speed.
Figure 12:
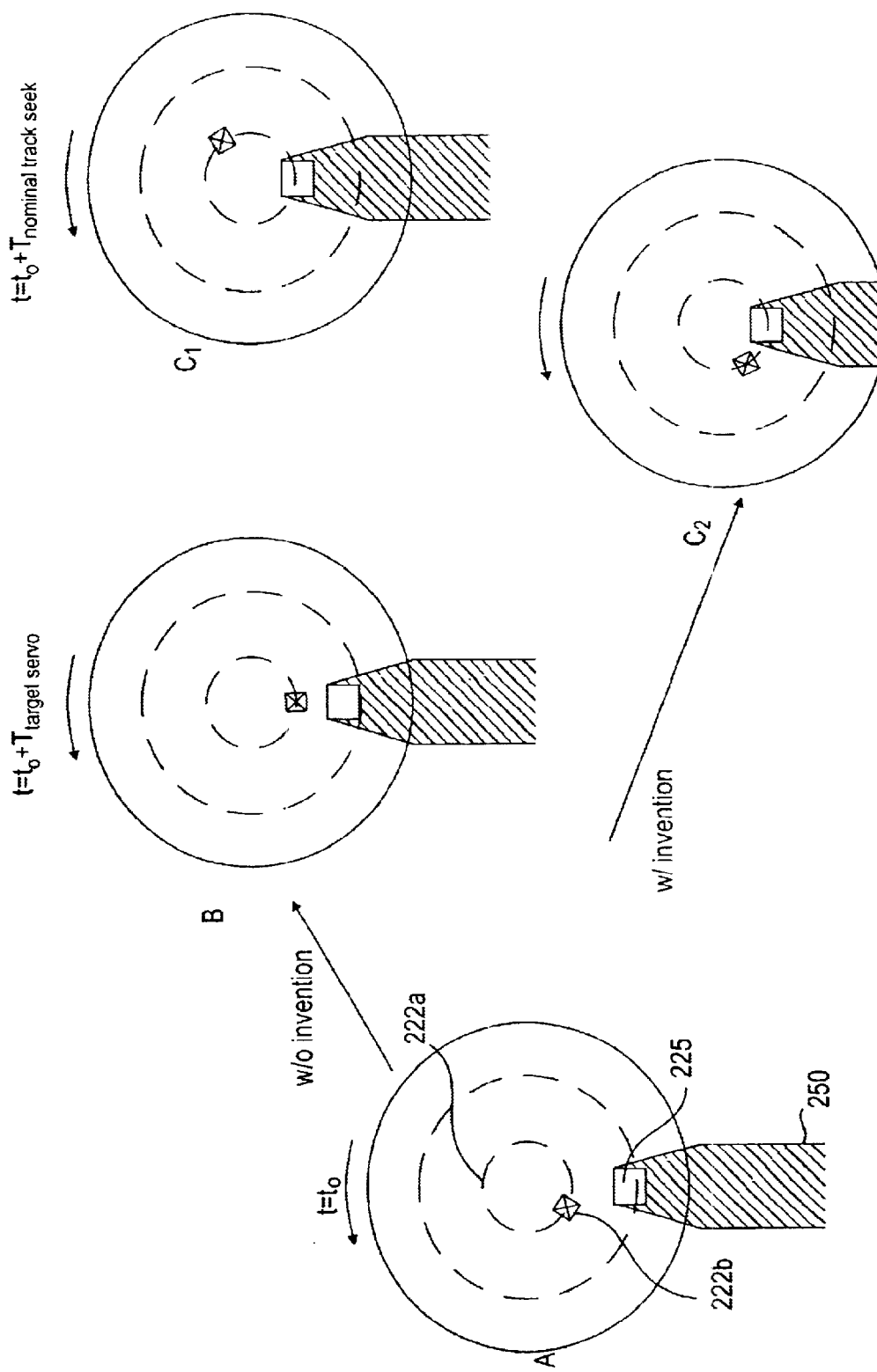
FIG. 12 shows an enlarged version of the disk, head, and actuator of FIG. 2 and illustrates an embodiment of the present invention where the spindle speed is sped up versus prior art processes having nominal spindle speed.

With reference to FIGS. 2, 11, and 12, the following case examples, where the desired data starts at a location ($x_{PES}(t_f), \theta_{Spindle}(t_f)$), illustrate how joint spindle speed and head position control allows reduction in rotational latency. It should be noted that FIGS. 11 and 12 are enlarged versions of the disk, head, and actuator of FIG. 2 and are used to aid in the illustration of the present invention versus prior art processes.

Under the prior methods of decoupled spindle speed (i.e., nominal speed) and head position, depending on the starting location, ($x_{PES}(t_0), \theta_{Spindle}(t_0)$), if the seek/settle time of the head 225 exceeds the amount of time it takes the data 222b to reach the desired angular position ($T_{trackseek} > T_{targetservo}$), the data would have gone past the head by the time the head arrives (See FIG. 11 A, $B_1$, and C). So, once the head settles (See FIG. 11C), the head would have to wait for almost a full rotation of the spindle before the desired data would reach the desired angular position again in order for the head to be able to read the data. Thus, valuable time would be lost.

However, by using the present invention to slow down the spindle 230 and then accelerate it back to attain the nominal speed, it is possible to coincide the time of arrival of the head 225 on the track 222a with the rotational position (sector 222b) of the desired data (See FIG. 11 A and $B_2$). Using the present invention, the rotating media storage system actuator 250 and the read-write head assembly 225 will glide over the platter 220 to arrive over a unique track of interest 222a (track seeking time) prior to or at approximately the same time as when the unique sector of interest (target sector 222b) passes under the head to be read (or written).

It should be noted that the present invention is not limited to only slowing down the spindle speed so that the head assembly 225 can reach the data target sector 222b in optimum time. Consider for example the case when at the time of the data access request, the desired data target sector 222b was at an angular position too close to the angular position where the read-write head assembly 225 would have accessed it (See FIG. 12 A, B, and $C_1$). In other words, it would be impossible to slow down the spindle 230 speed (short of going to a complete spindle stop) and still be able to access the needed data.

In this case, as part of the present invention, the spindle 230 would be accelerated (and thus speed up the disk platter rotation 220) so that the data sector 222b was relatively close to or at the angular position necessary for access at approximately the same time the read-write head assembly 225 reaches the desired track 222a (see FIG. 12 A and $C_2$). Thus, wait/access time for the desired data 222b to be read by head assembly 225 (which is already in position at the desired track 222a) is reduced significantly.

In one embodiment of the present invention the actuator movement information (and thus head 225 movement information) and target sector information (and thus spindle 230 movement information) are analyzed and controlled by the joint controller 275. It should be noted that the joint controller 275 is illustrated as being a separate element; however, other configurations may also be possible and the particular configuration shown in the figure is meant merely to be exemplary. For example, the joint controller 275 may be a part of the rotating media interface controller with CPU 260, it may be incorporated into the spindle motor control 240, it may be incorporated into the actuator control 255, or the actuator, spindle, and joint controller may all be combined into one element, and any other combination thereof. One of the most common ways to determine the position of the read-write head 225 (as the head is moving across platter 220) is to employ a feedback system 280. It should be noted that, as with the joint controller 275, other configurations for the feedback system 280 may also be used.

The present invention would lead to minimal, if any, rotational latency and the data would be available as the head arrives and settles on the track (minimizes the track following time). Because joint spindle speed and head position control performs minimization over a larger set of admissible input trajectories (than prior systems), such a joint control system and method would give a better (lower) minimum value of time to read/write the desired data.

The following is an example of one embodiment of the present invention. In this example the constant/nominal speed read-write with joint spindle speed and head position control is discussed in greater detail. Additionally, in this example this embodiment of the present invention is compared to using constant/nominal spindle speed with the prior optimal track seek system and method discussed in the background of the invention.

Example 1

Figure 3:
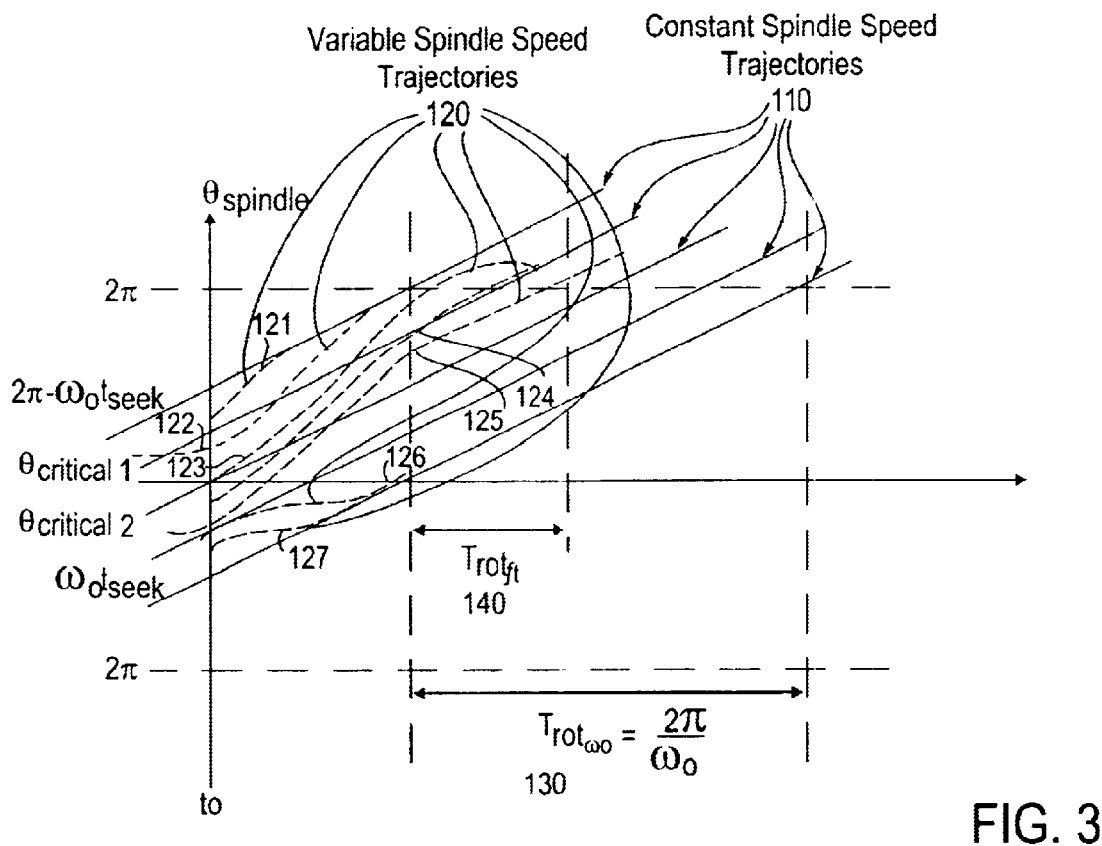
FIG. 3 is a graphical representation that compares constant/nominal spindle speed trajectories (calculated using prior art methods) with varying/multiple spindle speed trajectories (calculated using one embodiment of the present invention) as a function of time.
Figure 4:
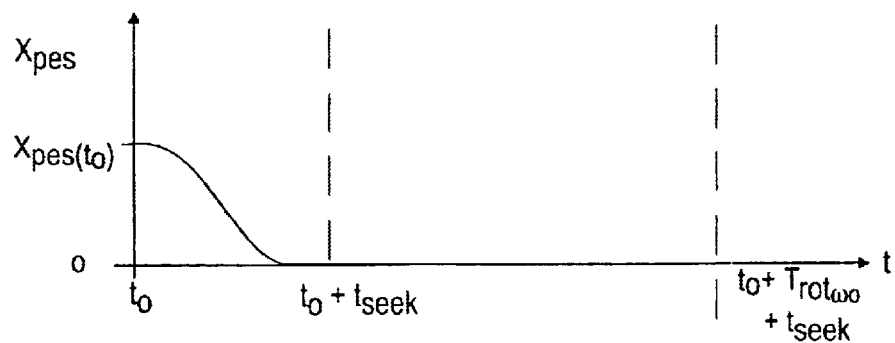
FIG. 4 is a graphical representation of a case analyzing a given starting head position and a corresponding optimal trajectory to arrive at the desired track in a seek time.

Constant/Nominal Speed Read-Write Embodiment,
$\dot{\theta}_{spindle}(t_f)=\omega_0$ FIG. 3 shows trajectories of $\theta_{spindle}$ with respect to time. Solid lines 110 represent constant/nominal spindle speed controlled trajectories (see the background of the invention) and dashed lines 120 represent joint spindle speed and head position control trajectories (present invention). In this example, a case for a given starting head position, $X_{PES}(t_0)$, and a corresponding optimal trajectory to seek the desired track in a time, $t_{seek}$, is analyzed, as illustrated in FIG. 4.

Looking at the solid lines 110 of FIG. 3, the worst-case delay due to rotational latency 130 is given by $$T_{rot_{\omega_0}} = \frac{2\pi}{\omega_0}$$

for the constant spindle speed control (as discussed in the background section). In the case of constant spindle speed, the head arrives at the desired track position $X_{PES}=0$ at time $t_0+t_{seek}$ and must wait for a period of time up to $t_0+t_{seek}+T_{rot}^{\omega_0}$ for the desired data sector to arrive in the proper position under the head to enable reading/writing.

In the embodiment of the present invention having joint spindle speed and head position control, see FIG. 3 dashed lines 120, when $\theta_{spindle}(t_0)$ is greater than zero (0) and close to $2\pi-\omega_0 \, t_{seek}$, the optimal trajectories will result from first accelerating the spindle speed and then decelerating the spindle speed so that at time, $t_0+t_{seek}$, $\theta_{spindle}(t_0+t_{seek})=2\pi$. Such a case is illustrated in FIG. 3 by dashed lines 121 and 122.

Dashed lines 123, 124, and 125 in FIG. 3 illustrate a starting position, $\theta_{spindle}(t_0)$, where the arrival position, $\theta_{spindle}(t_f)=2\pi$, however, $t_f<t_0+t_{seek}$. In this type of case, the upper limit on spindle acceleration (or speed) does not allow the spindle to arrive at $\theta_{spindle}(t_0+t_{seek})=2\pi$. Instead, the upper limit of $\theta_{spindle}(t_0)$ for these cases is $\theta_{critical\,1}$. Once the value of $\theta_{spindle}(t_0)$ drops to below a value $\theta_{critical\,2}$, the optimal spindle trajectory slows down to reach an arrival position, $\theta_{spindle}(t_f)=0$. Dashed lines 126 and 127 in FIG. 3 illustrate the slowing down of the spindle to reach spindle position $\theta_{spindle}(t_f)=0$.

It should be noted that by using the present invention, the worst-case delay before read-write has reduced substantially from $$T_{rot_{\omega_0}} = \frac{2\pi}{\omega_0},$$

the worst-case delay in the prior constant spindle speed control case (see FIG. 3, 130), to $T_{rot_{j1}}$ in the joint spindle speed and head position control case (see FIG. 3, 140).

Figure 5:
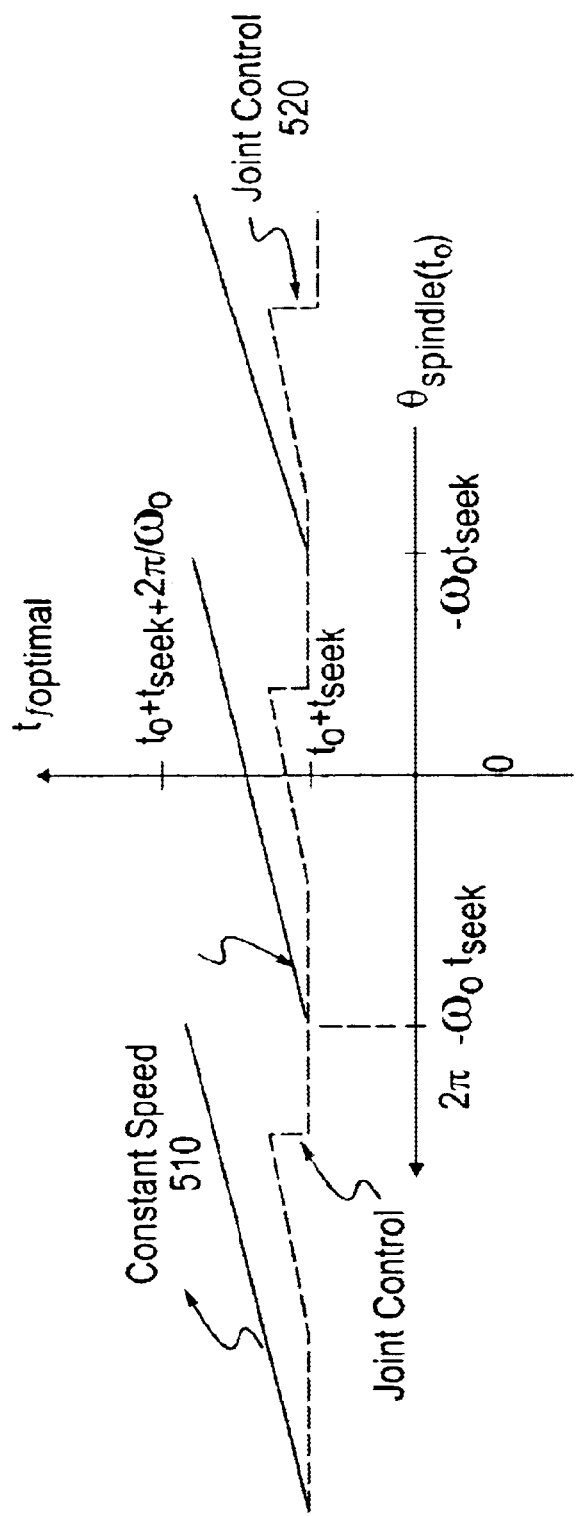
FIG. 5 is a graphical representation of the value of the optimal time for the prior art method (using the constant/nominal spindle speed) and the present invention (using joint spindle speed and head position control).

It should also be noted that the distribution of rotational latency using joint spindle speed and head position control is very different from the constant spindle speed control case. FIG. 5 shows the value of the optimal arrival time, $t_{f_{optimal}}$, for the constant spindle speed case as solid line 510 and for the joint control case of the present invention as dashed line 520. As shown in FIG. 5, the shape of the distribution of the two lines 510 and 520 illustrates that the average value of the optimal arrival time, $t_{f_{optimal}}$, over the starting spindle position, $\theta_{spindle}(t_0)$, is much closer to $(t_{0+}T_{seek})$ for joint control 520 than for the constant speed control case 510. Thus, the present invention reduces the distribution of the rotational latency of the rotational media storage system, making the system more predictable and giving the system more repeatability.

As stated above, the present invention can also be used to optimize data access time while reducing the rotating media storage system power consumption and/or reducing the mechanical disturbances of the system. The example below provides details on how the data access time optimization is accomplished by the present invention.

Example 2

Power Reduction and/or Mechanical Disturbance Reduction Embodiment using Joint Spindle Speed and Head Position Control Power reduction may be useful during track seeks to improve latency. Power reduction may also be used during periods of inactivity.

In order to improve latency during track seek the power consumption of the actuator may be reduced. By reducing the power of the actuator, the time it takes for the head to reach the desired track is increased. Thus by delaying the time it takes the head to reach the desired track will affect the speed of the spindle needed to get the desired sector of data to arrive under the head at the approximate time for reading/writing the data. As illustrated in FIG. 3, when $\theta_{critical\,1}<\theta_{spindle}(t_0)<\theta_{critical\,2}$, it is possible to slow down actuator (or VCM) input (i.e., reduced power) and still achieve the same optimal arrival time, $t_{f_{optimal}}$, as with the fastest track seek. In such situations, the joint trajectory optimization can be reformulated to minimize power in addition to the final arrival time. In the formulations described above, the minimum time for the track seek is changed from $$\min_{u}(t_f) \quad \text{to} \quad \min_{u}\left(t_f + \rho \int_{t_0}^{t_f} u^2_{Actuator}(t)dt\right).$$

As stated above, in addition to reducing power during track seeks, it may also be desirable to reduce power during periods of inactivity without sacrificing a great deal of latency. Previous methods consist of detecting periods of inactivity and bringing the spindle motor to a stop. In such previous methods, upon reactivation by the CPU, the drive spins-up and then the head is brought to the desired track once the spindle achieves full rotation speed. Thus, the spin-up trajectory for such a method is not time optimal. Spindle motor spin-up can also induce vibrations and thus increase the tracking error unless resonances in the system are accounted for in the time optimal trajectories.

The present invention also has two optional embodiments to reduce power and/or mechanical disturbances during periods of inactivity without sacrificing a great deal of latency. In one of the optional embodiments, time-optimal joint trajectory optimization of spin-up, track seek, and settle including resonance dynamics is performed. The time-optimal joint trajectory optimization formulation is modified to include minimization of weighted sum of final time, energy in the actuator (i.e., VCM), and energy in the spindle motor.

In another optional embodiment, the present invention performs a power optimal spin-down to partial speeds depending upon the expected time that the data will be needed, such that:

$P=$Spindle Motor Dissipation$=k_1\omega^n$spindle where $n \geq 3$. It should be noted that the origin of the above equation comes from the fact that power dissipation is equal to the product of torque and rotational speed:

Power=Torque·$\omega_{Spindle}$

Viscous drag on the rotating assembly increases as $$Torque_{drag} = \frac{1}{2}C_D\omega^2_{Spindle}.$$

Thus, power dissipation due to drag increases as $$Power_{drag} = \frac{1}{2}C_D\omega^3_{Spindle}.$$

This means that doubling the rotational speed increases power dissipation by a factor of eight (i.e., $2^3$). Therefore, an example spin-down to $$\frac{\omega_0}{2}$$

reduces spindle motor powers to $$P_0 = k_1 \left(\frac{\omega_0}{2}\right)^3 = k \frac{\omega_0}{8}.$$

As part of the present invention, a parameterized table of expected-time-to-data and power average may also be constructed and used in real-time either automatically by the system or manually by the system designer/user.

Joint Spindle Speed and Head Position Control for Varying/Multiple Speed Read and Write Rotating Media Storage Systems As discussed above, in most of the current read-write channels and servo systems, the designs require that the read-write operations occur at constant fixed rates. However, if there is no restriction on fixed data rate or speed, then further reduction in latency and seek/settle time is possible. Such further reduction in latency and seek/settle time may be achieved by relaxation of the constraint to reach the nominal spindle speed. Such a system may have a varying/multiple read/write speeds. In other words, rather than requiring a specific nominal speed for read and write this type of system may be able to read/write at multiple varying speeds (or any speed) so long as during the process of reading/writing that the spindle remains at that same speed. To maintain minimal flux changes, a minimum rotational spindle speed, $\omega_{min}$, is desired. Thus, for example, the trajectory optimization in a joint control system having varying/multiple read/write speeds may be formulated as:

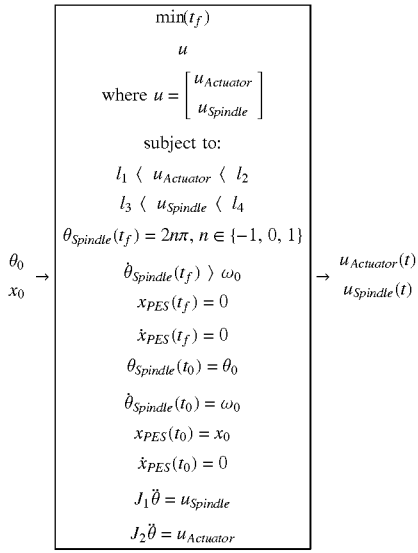

where $x_0$ is the initial radial position of the head position actuator, $\theta_0$ is the initial angular position of the spindle, $x(t)$ is the radial head position at time t, $\theta_{spindle}(t)$ is the angular position of the spindle at time t, $u_{Actuator}$ are the design variables of the actuator, $u_{spindle}$ are the design variables of the spindle, $l_1 < u_{Actuator} < l_2$ are the constraints on the actuator authority where $l_1$ and $l_2$ are the lower and upper limits, respectively, based on the actuator constraints and hardware, $l_3 < u_{Spindle} < l_4$ are the constraints on the spindle where $l_3$ and $l_4$ are the lower and upper limits, respectively, based on the spindle constraints and hardware, $\theta_{Spindle}(t_f) = 2n\pi$ is the arrival angular spindle position where $n \in \{-1,0,1\}$, $\dot{\theta}_{Spindle}(t_f) > \omega_{min}$ is the arrival angular spindle velocity where $\omega_{min}$ is the desired minimal rotational spindle speed, $x_{PES}(t)$ is the radial head position error and $x_{PES}(t)=x_{Desired}-x(t)$, $x_{PES}(t_f)=0$ is the arrival position error, $\dot{x}_{PES}(t_f)=0$ is the arrival velocity error, $\theta_{Spindle}(t_0)=0$ is the starting angular spindle position, $\dot{\theta}_{Spindle}(t_0)=0$ is the starting angular spindle velocity, $x_{PES}(t_0)=x_0$ is the starting position error, $\dot{x}_{PES}(t_0)=0$ is the starting velocity error, $J_1 \ddot{\theta} u_{Spindle}$ represents the platter rotation physical equations of motion for angular spindle position where $J_1$ is a coefficient of inertia and $\theta$ is acceleration of the spindle, and $J_2 \ddot{x} = u_{Actuator}$ represents the physical equations of motion for radial head position where $J_2$ is a coefficient of inertia and $\ddot{x}$ is acceleration of the head.

It should be noted that the physical equations of motion given in the formulation above have been simplified for ease of understanding herein. As such, one with ordinary skill in the art would know that the equations of motion given in the formulation above are merely representational and other equations of motion with greater detail and more variables may be used.

Additionally, each of these formulations can be modified to include resonant modes in the dynamics of actuator to head position, spindle motor to spindle speed and any disturbance dynamics or coupled dynamics.

Figure 6:
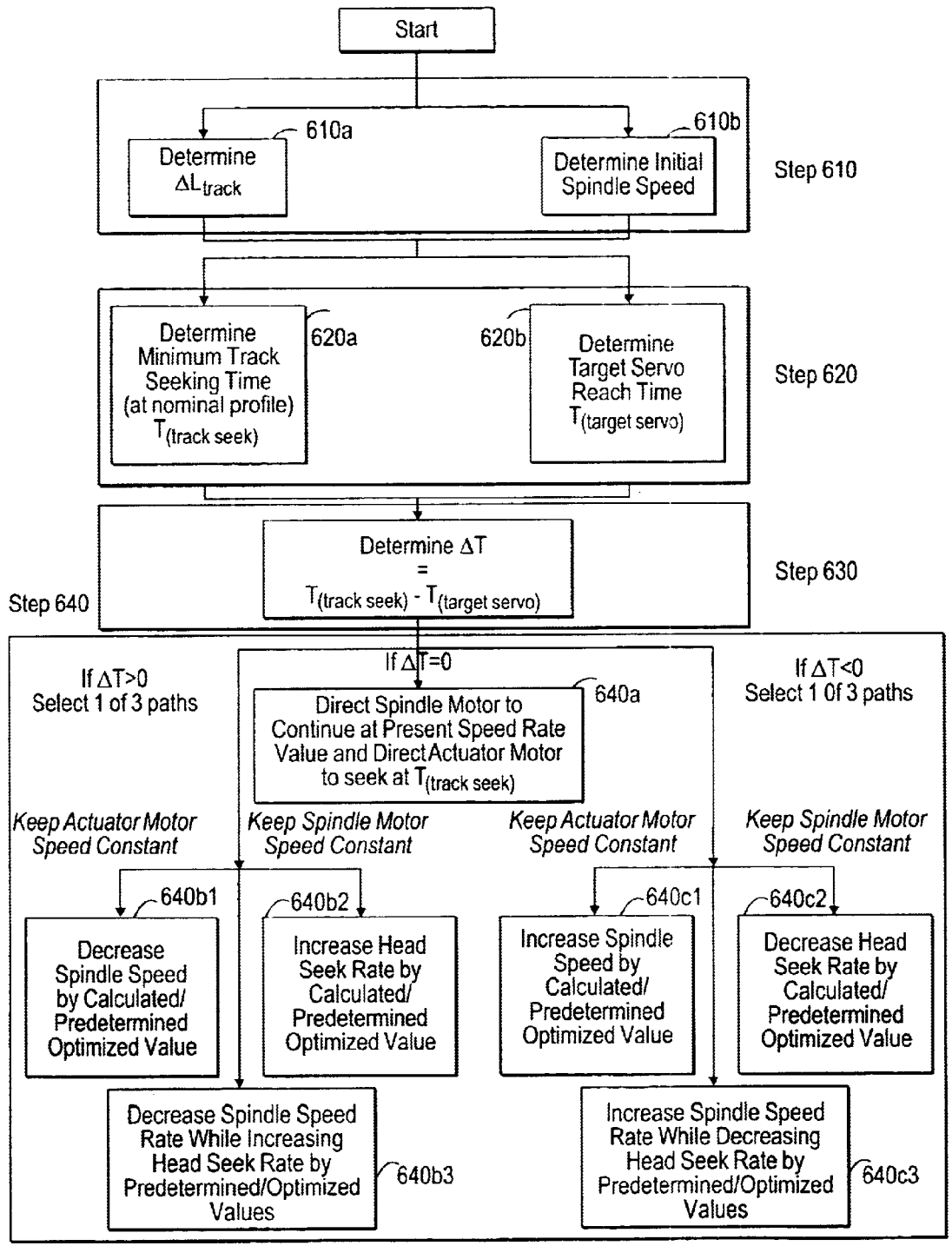
FIG. 6 represents a flowchart showing the steps for joint spindle speed and head position control in accordance with the principles of one embodiment of the present invention.

Joint Spindle Speed and Head Position Control for Dynamically Optimizing Various Operational Characteristics of a Rotating Media Storage System FIG. 6 is a block diagram of one embodiment of the present invention. The present invention may be configured so that it allows an end user to dynamically select and improve one or more operational characteristics (e.g., access time, power consumption, acoustics, heat generation, mechanical disturbances, etc.) based on the specific requirements defined by the end user for that application and particular rotating media storage system.

In one embodiment, the present invention starts at step 610 by determining (a) the positional difference between the present track and the target track for the head assembly, $\Delta L_{track}$ (step 610a) and (b) the time for one revolution of the rotating media storage element, for example a disk platter (step 610b). Step 610a determines how far the head assembly 225 is from its present track (item 221a in FIG. 2) to the target track (item 222a in FIG. 2). The track and sector servo information is generally provided by the feedback system 280. Step 610b determines how fast the spindle 230 (and thus the platter 220) is currently spinning, i.e. spindle initial rotational speed. It should be noted that steps 610a & b may be performed in any order and/or simultaneously.

In the next step, step 620, the present invention determines (a) the track seeking time at a nominal profile (step 620a) and (b) the target servo sector reach time (step 620b). In step 620a, the track seek time at the nominal profile, $T_{(track\_seek)}$, is calculated as the minimum amount of time required to move the head 225 from the present track 221a to the target track 222a along a radial arc (item 223 on FIG. 2) on the rotating media storage element. The present invention uses the result generated in step 610a as input and then applies any known techniques in the art to calculate $T_{(track\_seek)}$. In step 620b, the target servo sector reach time, $T_{(target\_servo)}$, may be calculated based on how fast the spindle 230 is spinning (obtained from step 610b) or any other methods currently known in the art, such as target sector reach time approximation. It should be noted that $T_{(target\ servo)}$ may be calculated as a minimum and maximum range of time that it would take the desired data to reach the desired angular position.

Continuing with FIG. 6, at step 630, the present invention takes into consideration the present speed of the spindle 230 and the head assembly actuator movement time (i.e., track seeking time) to determine whether the read-write head 225 would reach the desired target servo sector 222*b* at substantially the same time, i.e., ΔT=0, within some pre-specified accuracy. To make this determination, the present invention calculates the difference between the minimum track seeking time, $T_{(track\ seek)}$, calculated in step 620*a* and the target servo sector reach time, $T_{(target\ servo)}$, calculated in step 620*b*:

$$\Delta T = T_{(track\ seek)} - T_{(target\ servo)}.$$

It should be noted that (a) if ΔT=0→ the read-write head 225 would reach the desired target servo sector 222*b* at substantially the same time;

(b) if ΔT>0→ the read-write head 225 would reach the desired target track 222*a* after the desired servo sector 222*b* passes by (i.e., read-write head 225 arrives late);

(c) if ΔT<0→ the read-write head 225 would reach the desired target track 222*a* before the desired servo sector 222*b* passes by (i.e., read-write head 225 arrives early).

At step 640, based on the ΔT results obtained in step 630 and any requirements set by the rotating media storage system designer (for example, "obtain the fastest data access time while minimizing power consumption and acoustics"), the joint spindle speed and head position/VCM control method and system of the present invention considers a number of alternate paths to determine the optimal read-write head trajectory and optimal spindle rotation trajectory. It should be noted that the operational characteristics/ requirements set by the rotating media storage system designer could be any combination of access time, power consumption, acoustics, heat generation, mechanical disturbances, etc. and may sacrifice performance in some areas in order to improve others. Such configurations will depend upon the desired use of the particular rotating media storage system.

If ΔT=0, in one embodiment, the present invention may direct the spindle motor to continue at the present rate and direct the actuator 250 to seek at $T_{(track\ seek)}$, so that the read-write head 225 reaches the target track 222*a* at the same time the target sector 222*b* passes under the head 225 (step 640*a* in FIG. 6).

If ΔT>0 (i.e., "head is slow in reaching target track"), the present invention may consider a number of alternate paths. In one embodiment, the present invention may direct the read-write head 225 to continue at its nominal or default rate but decrease the spindle rotational rate (and thus the rotational speed of the platter) to a value such that the read-write head 225 reaches the target track 222*a* at the same time the target sector 222*b* passes under the head 225 (see step 640*b*1 in FIG. 6). The wait time for the read-write head is ultimately reduced. The amount of the spindle rotational rate decrease may be computed in real-time by the system. Similarly, spindle slowdown trajectory values may be optimally selected from a lookup table previously generated for the particular rotating media storage system being used. In this embodiment, the rotating media storage system would experience savings in power consumption, as well as reductions in data access time. This configuration may be attractive for systems that require fast data access times with restrictions on power consumption, acoustics, and thermal generation.

In another embodiment, if ΔT>0 (i.e., "head is slow in reaching target track"), the present may direct the spindle rotational rate (and thus the rotational speed of the platter) to continue at its current or default rate but increase the seek rate of the read-write head 225 (i.e., increase actuator 250) speed to a value such that the read-write head 225 reaches the target track 222*a* at the same time the target sector 222*b* passes under the head 225 (see step 640*b*2 in FIG. 6). The wait time for the read-write head is optimized with respect to power consumption, noise and thermal generation. The amount of the read-write head seek rate increase may be computed in real-time by the system. Similarly, actuator head speed-up trajectory values may be optimally selected from a lookup table previously generated for the particular rotating media storage system being used. Although in this embodiment the rotating media storage system would not experience any savings in power consumption, the data access time may be reduced significantly. This configuration may be attractive for systems that require the fastest data access time possible without restrictions on power consumption. It should be noted that in most systems the nominal seek rate of the actuator is already set to the maximum seek rate and therefore cannot be increased, however, if a system is not arranged in this manner such a system may benefit from being able to speed up the track seek rate of the actuator.

In yet another embodiment, if ΔT>0 (i.e., "head is slow in reaching target track"), the present invention may direct the rotating media storage system to increase the seek rate of the read-write head 225 by a certain value while at the same time decrease the rotational rate of the spindle 230 so that the read-write head 225 reaches the target track 222*a* at the same time the target sector 222*b* passes under the head 225 (see Step 640*b*3 in FIG. 6). The amount of the read-write head seek rate increase and spindle rotational rate decrease may be computed real-time by the system. Similarly, actuator head speed-up trajectory values and spindle slowdown trajectory values may be optimally selected from a lookup table previously generated for that particular rotating media storage system. The benefit of using this configuration is that the rotational media storage system would experience a net reduction in power consumption and noise generation while at the same time optimizing the data access time.

If ΔT<0 (i.e., "head is fast in reaching target track"), the present invention may consider a number of alternative paths based on specific operational properties (e.g., access time, power consumption, acoustics, thermal, mechanical) the end user may want to optimize. In one embodiment, the present invention may direct the read-write head 225 to continue at its nominal or default rate but increase the spindle rotational rate (and thus the rotational speed of the platter) to a value such that the read-write head 225 reaches the target track 222*a* at the same time the target sector 222*b* passes under the head 225 (see step 640*c*1 in FIG. 6). The wait time for the read-write head is ultimately reduced. The amount of the spindle rotational rate increase may be computed real-time by the system. Similarly, spindle speed-up trajectory values may be optimally selected from a lookup table previously generated for that particular rotating media storage system. Although, in this embodiment the rotating media storage system would not experience any savings in power consumption, the data access time may be reduced significantly. This configuration may be attractive for systems that require the fastest data access time possible without restrictions on power consumption.

In another embodiment, if ΔT<0 (i.e., "head is fast in reaching target track"), the present invention may direct the spindle (and thus the platter) to continue at its current or default/nominal rotational rate but decrease the seek rate of the read-write head 225 to a value such that the read-write head 225 reaches the target track 222a at the same time the target sector 222b passes under the head 225 (see step 640c2 in FIG. 6). It should be noted however, that this embodiment is the "Just in Time Seek" method of the prior art (described in the background of the invention) and is not novel in and of itself, but the combination of this embodiment with the other novel embodiments of the present invention is believed to be novel. The wait time for the read-write head is optimized with respect to power consumption, noise and thermal generation. The amount of the read-write head seek rate decrease may be computed in real-time by the system. Similarly, actuator head slowdown trajectory values may be optimally selected from a lookup table previously generated for that particular rotating media storage system., In this embodiment, the rotating media storage system would experience savings in power consumption, as well as an optimization in data access time. This configuration may be attractive for systems that require fast data access times with restrictions on power consumption, acoustics, and thermal generation.

In yet another embodiment, if ΔT<0 (i.e., "head is fast in reaching target track"), the present invention may slowdown the seek rate of the read-write head 225 by a certain value while at the same time increase the rotational rate of the spindle 230 so that the read-write head 225 reaches the target track 222a at the same time the target sector 222b passes under the head 225 (see step 640c3 in FIG. 6). The amount of the read-write head seek rate decrease and spindle rotational rate increase may be computed in real-time by the system. Similarly, actuator head slowdown trajectory values and spindle speed-up trajectory values may be optimally selected from a lookup table previously generated for that particular rotating media storage system. As before, the benefit of using this configuration is that the rotational media storage system would experience a net reduction in power consumption and noise generation while at the same time optimizing the data access time.

Design Phase of Rotating Media Storage Systems having Joint Spindle Speed and Head Position Control The present invention may also be used during the design phase of rotating media storage systems to perform trade studies ("what if studies") in order to improve operational properties such as access time, power consumption, acoustics, heat generation, mechanical disturbances, etc. and thus optimize the rotating media storage system design as well as to optimize other system characteristics such as cost, materials, etc.

Figure 7:
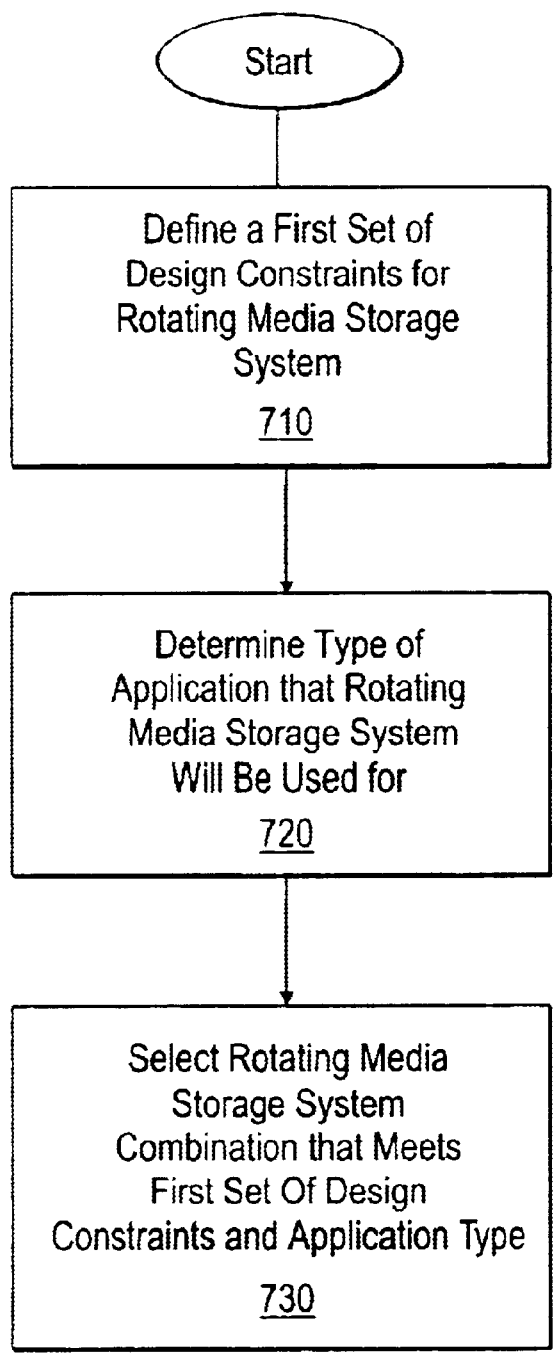
FIG. 7 represents a flowchart showing the steps of one embodiment for design optimization of rotating media storage designs using a joint spindle speed and head position control in accordance with the principles of the present invention.

Referring to FIG. 7, as an example, assume that for a particular application, the rotating media storage designer wants to improve the access time by ten percent in the quietest possible way or the lowest power possible way. At step 710, the designer would first set a constraint on the access time ("it has to be ten percent better or more") and then would begin optimizing power consumption or acoustics (or maybe the sum of both) subject to that constraint.

The system designer may consider the intended use (i.e., type of application) for the rotating media storage system (see step 720 in FIG. 7). The designer will take into account whether the system will be used for random data storage/access, for example, transaction databases such as for use with credit card transactions (in which case the access times are random) or will be used with structured/ordered data storage/access, for example, streaming media such as video (in which the access times tend to be shorter because the data tends to be well blocked).

It should be noted that steps 710 and 720 may be performed in any order and/or simultaneously. It should also be noted that this discussion does not go into great detail on the actual design process for designing a system. For more detailed information and examples on the design process and design cycle for designing various types of complex systems see: "Method for Computer-Aided Design of a Product or Process," U.S. Pat. No. 5,880,959, issued on Mar. 9, 1999, assigned to the assignee herein; and "Real-Time Planner for Design", U.S. patent application Ser. No. 09/345,172, filed Jun. 30, 1999, still pending and assigned to the assignee herein.

At step 730, the designer evaluates combinations of rotating media storage system components (e.g., actuator motor size, spindle motor size, actuator head size, spindle size, platter size, rotating media size, and power electronics, etc.) that will meet the design constraint (i.e., ten percent or better increase in data access time) and the type of application for which the system will be used. As part of step 730, the designer may use look-up tables having pre-computed spindle speed and head seek trajectory values calculated for a number of pre-defined spindle motor sizes, head assembly motor sizes, and power electronics (e.g., amplifier) to select the optimum system configuration. It should be noted that the term "size" as used herein may mean physical dimensions and/or weight of the particular component.

Figure 9:
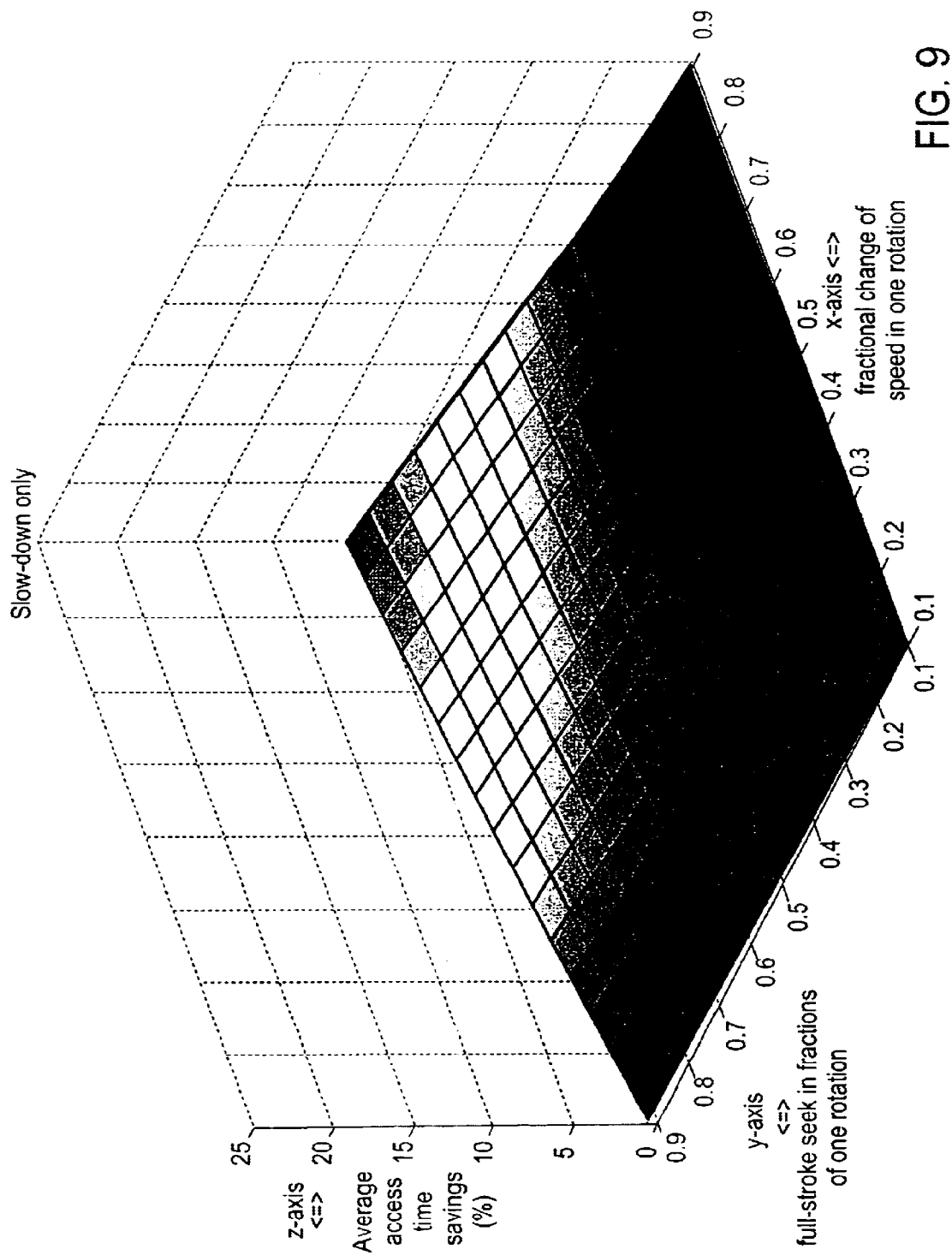
FIG. 9 shows an optimization graph generated using an embodiment of the present invention for a rotating media storage system having a spindle motor that may only be slowed-down from its nominal rotational speed.
Figure 10:
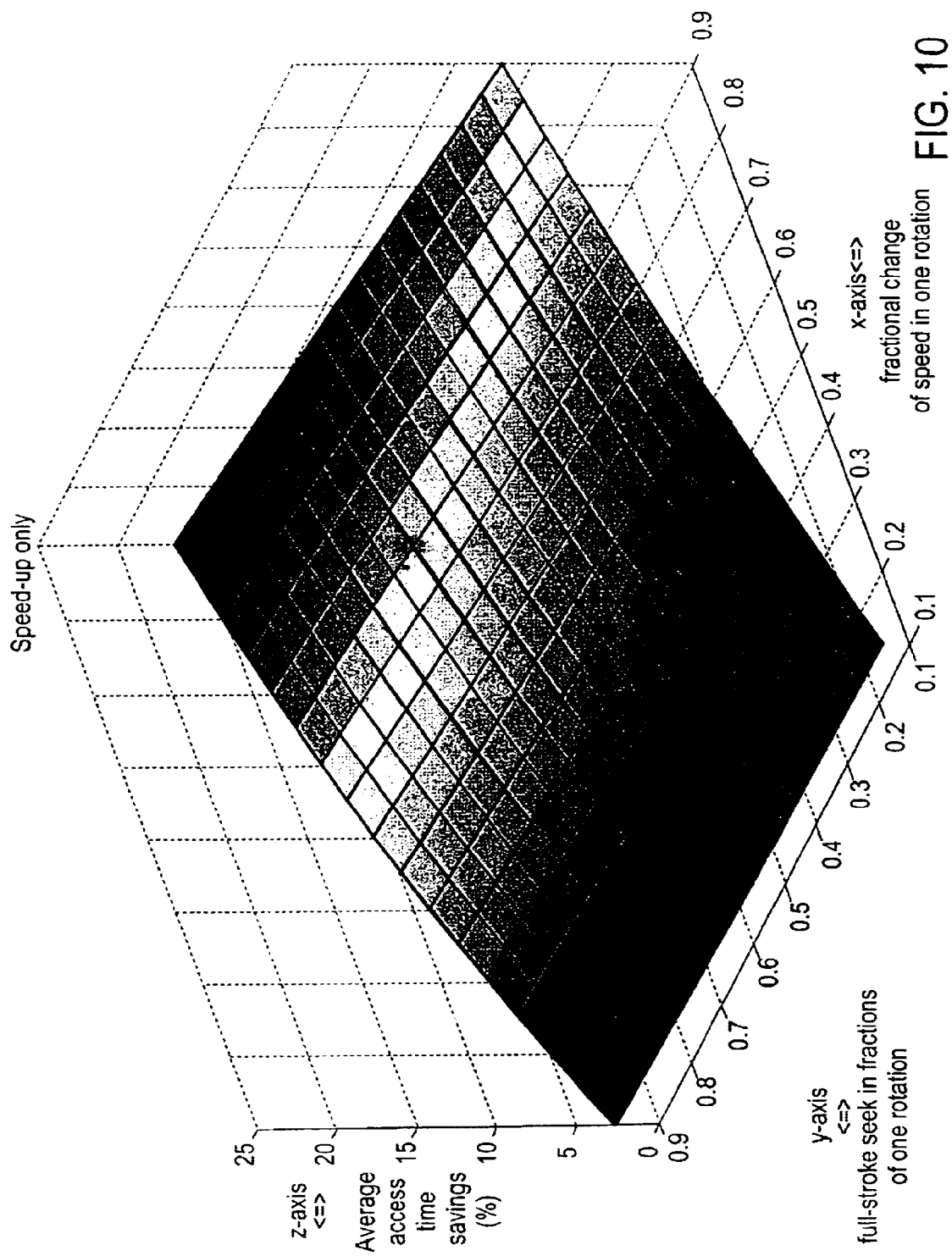
FIG. 10 shows an optimization graph generated using an embodiment of the present invention for a rotating media storage system having a spindle motor that may only be sped-up from its nominal rotational speed.

Alternatively, at step 730 the designer may rely on graphs generated using the joint spindle speed and head position control system of the present invention to optimize the design of the rotating media storage system. Three such optimization graphs are presented in FIGS. 8–10. The improvements illustrated in FIGS. 8–10 are computed as averages over all possible initial actuator head positions and desired data sectors.

Figure 8:
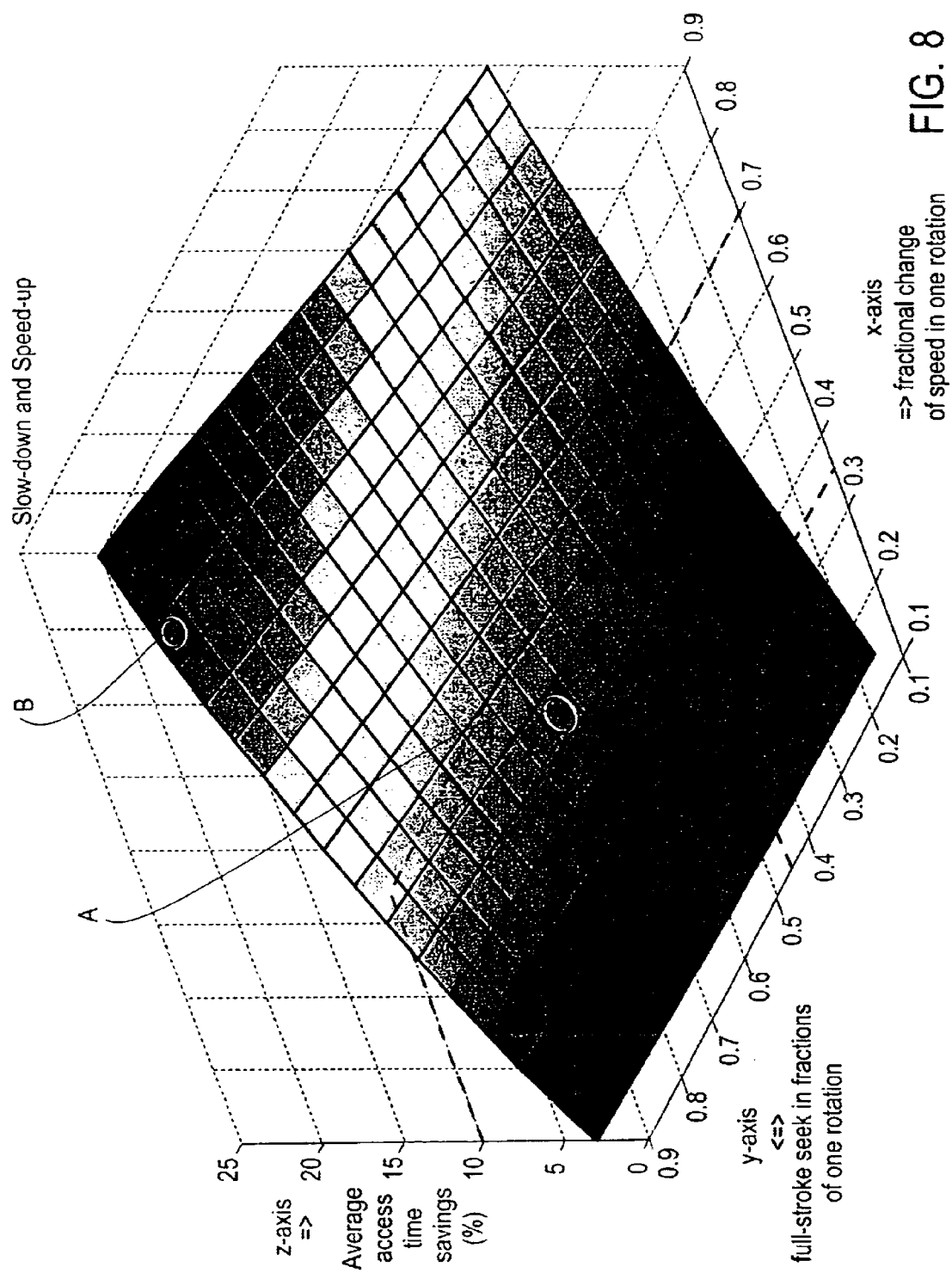
FIG. 8 shows an optimization graph generated using an embodiment of the present invention for a rotating media storage system having a spindle motor that may be slowed-down, sped-up, or a combination thereof.

FIG. 8 shows an optimization graph generated using a described embodiment of the present invention for a rotating media storage system having a spindle motor that may be slowed-down, sped-up, or a combination thereof where x-axis represents the fractional change of spindle speed in one rotation;

y-axis represents a full-stroke seek in fractions of one rotation; and z-axis represents the average access time savings in percent (%).

One example of how to use and interpret the graph in FIG. 8 is discussed below. Assume the designer evaluates two spindle motors, A and B, in order to decide which one would be the most appropriate for a particular rotating media storage system design. Choosing motor A (having a known size, power consumption, etc.) and using the present invention would enable head seeks to be 55% of one rotation and would allow the spindle to have a 35% fractional change of speed in one rotation. Therefore, using motor A and the present invention would improve the access time by 10% over a competitor's design (which is using the same rotating media storage system and the same size motor but is not using the present invention).

Similarly, the designer may want to choose a stronger motor B. This stronger motor would enable the head seeks to be 80% of one rotation and would allow the spindle to have a 70% fractional change of speed in one rotation. By using motor B and the present invention, the optimized rotating media storage system is approximately 15% faster than a competitor's design for the same system and the same size motor but that is not using the present invention.

FIGS. 9 and 10 may be used in a similar manner as that described above with respect to FIG. 8. FIG. 9 shows an optimization graph generated using an embodiment of the present invention for a rotating media storage system having a spindle motor that may only be slowed-down from its nominal rotational speed. FIG. 10 shows an optimization graph generated using an embodiment of the present invention for a rotating media storage system having a spindle motor that may only be sped-up from its nominal rotational speed.

Thus, a method and system for joint spindle speed and head position control have been described. Although specific embodiments, including specific equipment, parameters, methods, and procedures have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

We claim:

1. A rotating media storage system comprising:
   an actuator assembly;
   a spindle assembly;
   a controller coupled to the actuator assembly and the spindle assembly, wherein the controller changes a rotation speed of the spindle assembly based upon a position information of a desired data sector and an arrival time for the actuator assembly.

2. The system of claim 1 wherein the actuator assembly comprises:
   an actuator;
   an actuator controller; and
   an actuator head.

3. The system of claim 1 wherein the spindle assembly comprises:
   a spindle;
   a spindle motor; and
   a spindle motor controller.

4. The system of claim 1 further comprising:
   a feedback system coupled to the actuator assembly.

5. A rotating media storage system comprising:
   an actuator;
   an actuator head coupled to the actuator;
   a spindle,
   a spindle motor coupled to the spindle;
   a joint spindle and actuator controller coupled to the actuator and the spindle motor, wherein the joint spindle and actuator controller changes a rotation speed of the spindle based upon a position information of a desired data sector and an arrival time of the actuator head.

6. The system of claim 5 further comprising:
   an actuator controller coupled between the actuator and the joint spindle and actuator controller.

7. The system of claim 5 further comprising:
   a spindle motor controller coupled between the spindle motor and the joint spindle and actuator controller.

8. The system of claim 5 further comprising:
   a feedback system coupled to the actuator.

9. A method comprising:
   determining a desired track;
   determining an initial spindle speed;
   determining a nominal track seek time;
   determining a target servo time;
   calculate a difference between the nominal track seek time and the target servo time;
   controlling a spindle speed based upon the difference between the nominal track seek time and the target servo time.

10. The method of claim 9 wherein the controlling of the spindle speed based upon the difference between the nominal track seek time and the target servo time comprises:
    if the difference between the nominal track seek time and the target servo time is equal to zero, then
    directing a spindle motor to maintain the spindle speed at the initial spindle speed; and
    directing an actuator to seek at a nominal track seek time.

11. The method of claim 9 wherein the controlling of the spindle speed based upon the difference between the nominal track seek time and the target servo time comprises:
    if the difference between the nominal track seek time and the target servo time is greater than zero, then
    calculating an optimized value for the spindle speed;
    directing a spindle motor to decrease the spindle speed to the optimized value; and
    directing an actuator to seek at the nominal track seek time.

12. The method of claim 9 wherein the controlling of the spindle speed based upon the difference between the nominal track seek time and the target servo time comprises:
    if the difference between the nominal track seek time and the target servo time is greater than zero, then
    calculating an optimized value for the spindle speed;
    calculating an optimized value for a track seek time;
    directing a spindle motor to decrease the spindle speed to the optimized value for the spindle speed; and
    directing an actuator to increase the track seek time to the optimized value for the track seek time.

13. The method of claim 9 wherein the controlling of the spindle speed based upon the difference between the nominal track seek time and the target servo time comprises:
    if the difference between the nominal track seek time and the target servo time is less than zero, then
    calculating an optimized value for the spindle speed;
    directing a spindle motor to increase the spindle speed to the optimized value; and
    directing an actuator to seek at the nominal track seek time.

14. The method of claim 9 wherein the controlling of the spindle speed based upon the difference between the nominal track seek time and the target servo time comprises:
    if the difference between the nominal track seek time and the target servo time is less than zero, then
    calculating an optimized value for the spindle speed;
    calculating an optimized value for a track seek time;
    directing a spindle motor to increase the spindle speed to the optimized value for the spindle speed; and
    directing an actuator to decrease the track seek time to the optimized value for the track seek time.

15. The method of claim 9 wherein the controlling the spindle speed based upon the difference between the nominal track seek time and the target servo time is performed using a joint spindle and actuator controller.

16. A computer readable medium containing executable instructions which, when executed in a processing system, cause the system to perform a method comprising:
   determining a desired track;
   determining an initial spindle speed;
   determining a nominal track seek time;
   determining a target servo time;
   calculating a difference between the nominal track seek time and the target servo time; and
   controlling a spindle speed based upon the difference between the nominal track seek time and the target servo time.

17. The computer readable medium of claim 16 wherein the controlling of the spindle speed based upon the difference between the nominal track seek time and the target servo time comprises:
   if the difference between the nominal track seek time and the target servo time is approximately equal to zero, then
   directing a spindle motor to maintain the spindle speed at the initial spindle speed; and
   directing an actuator to seek at a nominal track seek time.

18. The computer readable medium of claim 16 wherein the controlling of the spindle speed based upon the difference between the nominal track seek time and the target servo time comprises:
   if the difference between the nominal track seek time and the target servo time is greater than zero, then
   calculating an optimized value for the spindle speed;
   directing a spindle motor to decrease the spindle speed to the optimized value; and
   directing an actuator to seek at the nominal track seek time.

19. The computer readable medium of claim 16 wherein the controlling of the spindle speed based upon the difference between the nominal track seek time and the target servo time comprises:
   if the difference between the nominal track seek time and the target servo time is greater than zero, then
   calculating an optimized value for the spindle speed;
   calculating an optimized value for a track seek time;
   directing a spindle motor to decrease the spindle speed to the optimized value for the spindle speed; and
   directing an actuator to increase the track seek time to the optimized value for the track seek time.

20. The computer readable medium of claim 16 wherein the controlling of the spindle speed based upon the difference between the nominal track seek time and the target servo time comprises:
   if the difference between the nominal track seek time and the target servo time is less than zero, then
   calculating an optimized value for the spindle speed;
   directing a spindle motor to increase the spindle speed to the optimized value; and
   directing an actuator to seek at the nominal track seek time.

21. The computer readable medium of claim 16 wherein the controlling of the spindle speed based upon the difference between the nominal track seek time and the target servo time comprises:
   if the difference between the nominal track seek time and the target servo time is less than zero, then
   calculating an optimized value for the spindle speed;
   calculating an optimized value for a track seek time;
   directing a spindle motor to increase the spindle speed to the optimized value for the spindle speed; and
   directing an actuator to decrease the track seek time to the optimized value for the track seek time.

22. A method for designing a rotating media storage system comprising:
   defining a first set of design constraints for the rotating media storage system;
   determining an application type for the rotating media storage system;
   selecting a set of components for the rotating media storage system that meets the first set of design constraints and the application type including actuator head control.

23. The method of claim 22 wherein the first set of design constraints are selected from the group consisting of: access time, power consumption, acoustics, heat generation, mechanical disturbances, and any combination thereof.

24. The method of claim 22 wherein the first set of design constraints are selected from the group consisting of: access time, power consumption, acoustics, heat generation, mechanical disturbances, cost, materials, and any combination thereof.

25. The method of claim 22 wherein the application type is selected from the group consisting of: random data access, ordered data access, and any combination thereof.

26. The method of claim 22 wherein the set of components for the rotating media storage system that meets the first set of design constraints and the application type include: actuator motor size, spindle motor size, actuator head size, spindle size, platter size, rotating media size, and power electronics.

* * * * *